(12) United States Patent
Baszucki et al.

(10) Patent No.: US 9,550,125 B2
(45) Date of Patent: Jan. 24, 2017

(54) DYNAMIC AND SCALABLE TOPOLOGY FOR VIRTUAL WORLD ENVIRONMENTS

(75) Inventors: David B. Baszucki, Portola Valley, CA (US); Erik S. Cassel, San Mateo, CA (US); John Shedletsky, San Francisco, CA (US); Matt Dusek, Belmont, CA (US)

(73) Assignee: ROBLOX CORPORATION, San Mateo, CA (US)

( * ) Notice: Subject to any disclaimer, the term of this patent is extended or adjusted under 35 U.S.C. 154(b) by 1836 days.

(21) Appl. No.: 12/251,389

(22) Filed: Oct. 14, 2008

(65) Prior Publication Data

US 2010/0093438 A1  Apr. 15, 2010

(51) Int. Cl.
| | |
|---|---|
| A63F 9/24 | (2006.01) |
| A63F 13/00 | (2014.01) |
| A63F 13/63 | (2014.01) |
| A63F 13/352 | (2014.01) |
| A63F 13/30 | (2014.01) |
| A63F 13/79 | (2014.01) |
| A63F 13/56 | (2014.01) |
| A63F 13/795 | (2014.01) |

(52) U.S. Cl.
CPC .............. *A63F 13/63* (2014.09); *A63F 13/12* (2013.01); *A63F 13/352* (2014.09); *A63F 13/56* (2014.09); *A63F 13/79* (2014.09); *A63F 13/795* (2014.09); *A63F 2300/531* (2013.01); *A63F 2300/535* (2013.01); *A63F 2300/5533* (2013.01); *A63F 2300/5553* (2013.01)

(58) Field of Classification Search
CPC ............................................. A63F 2300/5553
USPC ............................................................ 463/42
See application file for complete search history.

(56) References Cited

U.S. PATENT DOCUMENTS

| | | | | |
|---|---|---|---|---|
| 5,581,696 | A * | 12/1996 | Kolawa | G06F 11/3624 714/38.1 |
| 6,015,348 | A * | 1/2000 | Lambright et al. | 463/42 |
| 6,271,843 | B1 * | 8/2001 | Lection | G06T 15/00 434/62 |
| 2002/0086732 | A1 * | 7/2002 | Kirmse et al. | 463/42 |
| 2006/0258462 | A1 * | 11/2006 | Cheng et al. | 463/42 |
| 2007/0218997 | A1 * | 9/2007 | Cho | 463/42 |
| 2008/0220873 | A1 * | 9/2008 | Lee et al. | 463/42 |
| 2009/0089684 | A1 * | 4/2009 | Boss | A63F 13/10 715/757 |
| 2009/0113314 | A1 * | 4/2009 | Dawson | G06F 3/011 715/757 |
| 2009/0253494 | A1 * | 10/2009 | Fitch et al. | 463/25 |
| 2009/0276718 | A1 * | 11/2009 | Dawson | A63F 13/10 715/753 |
| 2010/0070859 | A1 * | 3/2010 | Shuster | A63F 13/358 715/706 |

\* cited by examiner

*Primary Examiner* — Steven J Hylinski
(74) *Attorney, Agent, or Firm* — Lowenstein Sandler LLP

(57) ABSTRACT

The present invention pertains to a method and apparatus for providing a dynamic and scalable topology for virtual world environments. In one embodiment, the method may include determining, in response to a request of a user computer system to transfer from a first place to a second place in a virtual environment, an instance of a second place that satisfies the request. The method may also include directing the user computer system to a game server that provides the determined instance of the second place.

26 Claims, 11 Drawing Sheets

DYNAMIC AND SCALABLE TOPOLOGY FOR VIRTUAL WORLD ENVIRONMENTS

FIELD OF THE INVENTION

This invention relates to the field of computer-aided modeling of virtual reality and, in particular, to the providing a dynamic and scalable topology for virtual world environments.

BACKGROUND

Building and playing with models online in a virtual world is becoming increasingly popular among various users. Internet-based virtual worlds are simulated, enabling users to travel within a virtual world, play games within the virtual world, and interact with other inhabitants (i.e., other users) of the virtual world. A virtual world is defined by a topology of spatial relationships between connected or adjacent places of the virtual worlds. The topology defines the way in which geographic regions/places are connected or otherwise linked together in a particular virtual world.

Typical virtual world topologies provide for contiguous landscapes of connected places. In terms of a map of the United States, California is connected to Nevada which in turn is connected to Utah, etc. The states, or places, bordering one another are physically connected and thus define the contiguous landscape of the United States. As in real life, there is only one copy of each place in a virtual world, no matter how many users are in the place. As such overcrowding of popular places may lead to the exclusion of users from the place until space is available, or the place may become difficult to navigate within. For example, in a flat, contiguous virtual world environment such as SECOND LIFE™, there is a limit to the number of players that can occupy a specific quadrant or acre of land. When the limit is reached, no additional players are allowed access to that quadrant and thus are not allowed to visit popular places. Furthermore, much of the virtual world environment is left empty.

Other virtual worlds address the issue of crowding in popular places by distributing contiguous virtual world topologies among multiple computer servers. Thus, each server provides for a copy of the same contiguous virtual world. However, virtual worlds may only be populated by a few users creating empty user experiences. Furthermore, dedicating computing and network resources to unpopulated virtual worlds is inefficient.

BRIEF DESCRIPTION OF THE DRAWINGS

The present invention is illustrated by way of example, and not by way of limitation, in the figures of the accompanying drawings and in which.

DETAILED DESCRIPTION

Figure 1:
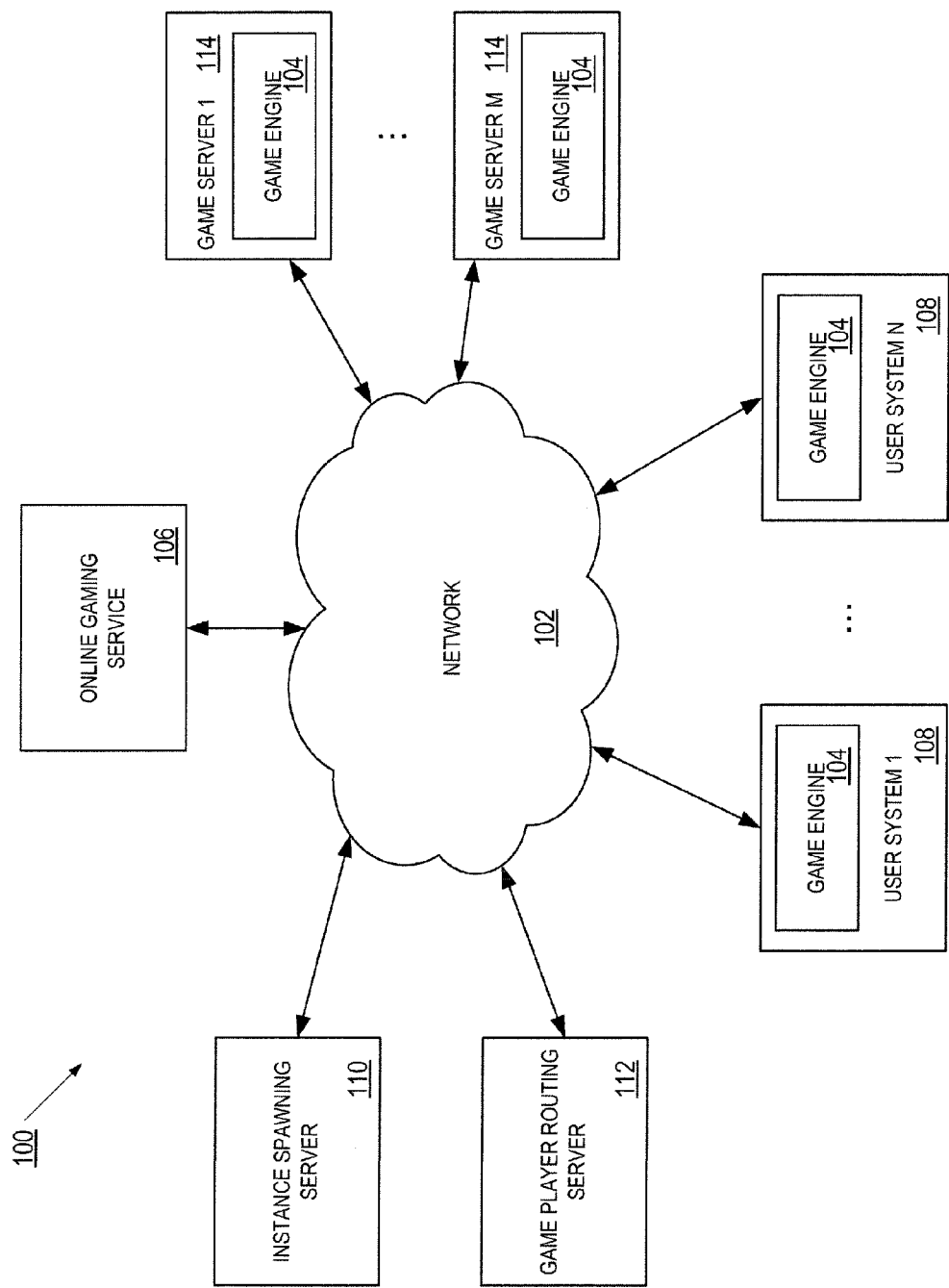
FIG. 1 illustrates one embodiment of network architecture in which embodiments of the present invention may operate.

In the following description, numerous specific details are set forth such as examples of specific systems, languages, components, etc. in order to provide a thorough understanding of the present invention. It will be apparent, however, to one skilled in the art that these specific details need not be employed to practice the present invention. In other instances, well known materials or methods have not been described in detail in order to avoid unnecessarily obscuring the present invention.

The present invention includes various steps, which will be described below. The steps of the present invention may be performed by hardware components or may be embodied in machine-executable instructions, which may be used to cause a general-purpose or special-purpose processor programmed with the instructions to perform the steps. Alternatively, the steps may be performed by a combination of hardware and software.

The present invention may be provided as a computer program product, or software, that may include a machine-readable medium having stored thereon instructions, which may be used to program a computer system (or other electronic devices) to perform a process according to the present invention. A machine readable medium includes any mechanism for storing or transmitting information in a form (e.g., software, processing application) readable by a machine (e.g., a computer). For example, a machine-readable medium includes a machine readable storage medium (e.g., read only memory ("ROM"), random access memory ("RAM"), magnetic disk storage media, optical storage media, flash memory devices, etc.), etc.

The present invention may also be practiced in distributed computing environments where the machine readable medium is stored on and/or executed by more than one computer system. In addition, the information transferred between computer systems may either be pulled or pushed across the communication medium connecting the computer systems.

Some portions of the description that follow are presented in terms of algorithms and symbolic representations of operations on data bits that may be stored within a memory and operated on by a processor. These algorithmic descriptions and representations are the means used by those skilled in the art to effectively convey their work. An algorithm is generally conceived to be a self-consistent sequence of acts leading to a desired result. The acts are those requiring manipulation of quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, parameters, or the like.

A method and apparatus for providing a dynamic and scalable topology for virtual world environments is described. A topology of a virtual environment defines the connections between different places in the virtual environment. Furthermore, for each place in the virtual environment, multiple instance of each place may be provided. Thus, virtual environment topologies, as discussed herein, include a plurality of connected places and zero or more instances of each place from the plurality. The topology may be provided to user computer systems in a multiplayer online gaming environment over a network.

In one embodiment, when a request is received from a user computer system to transfer the user computer system from a first place to a second place in the virtual environment, a determination of an instance of the second place that satisfies the request from the computer system is made. The user computer system may then be directed to an online gaming service server that provides the determined instance of the second place. In one embodiment, the determination of where to route a user computer system may include the analysis of current runtime conditions of the virtual environment, servers that host the virtual environment, and properties associated with user computer systems. Furthermore, the determination of where to route a user computer system may also include analysis of selection criteria directed at enabling continuous user experience during routing between online gaming services, keeping "friends" together, keeping a community of users together, etc.

In one embodiment, the number of places, and instances of places, fluctuates during runtime based on runtime conditions. That is, additional instances of "popular" places are dynamically allocated/created to ensure that the popular places do not become overcrowded, thus hampering user experience. Conversely, unpopular or empty places can be dynamically de-allocated/destroyed to avoid dedicating and wasting computing and networking resources on unpopular places. The decision of how many instances of each place to run may be determined by analyzing runtime conditions of the virtual environment.

FIG. 1 illustrates one embodiment of network architecture 100 in which embodiments of the present invention may operate. The architecture 100 includes an online gaming service 106 coupled to a communications network 102 such as a public network (e.g., the Internet, a wireless network, etc.) or a private network (e.g., LAN, Intranet, etc.). The online gaming service 106 communicates with multiple game servers, such as game servers 1 through M 114 via the network 102. The online gaming service 106 also communicates with multiple user systems, such as user system (user system 1 through user system N) 108 via the network 102. The online gaming service 106 further communicates with an instance spawning server 110 and a game player routing server 112 via the network 102.

Each game server 114 and user system 108 hosts a game engine 104. The game engine 104 is responsible for allowing a user to build models, play games, and navigate throughout virtual environments that are physically realistic in a 3D virtual world. Models are constructed from parts, or 3D virtual objects, that automatically join together to aid the user in editing. A part may be a primitive geometrical shape such as a block, a cylinder, a sphere, etc., or some other primitive shape such as a wedge, a torus, a tube, a channel, etc. Games are created by placing models in the 3D world. Games incorporate gameplay logic that triggers game events. The game engine 104 may publish a user's model or game by transferring the model or the game to an online gaming service 106. Furthermore, in one embodiment, the game engine 104 may indicate to an online gaming service 106 user-defined links, portals, or transports, between places in a virtual environment.

The online gaming service 106 is responsible for storing models and games created by users of the user systems 108. A user may be, for example, a young child (e.g., 6-10 years old), an older child, a teenager, or an adult. In one embodiment, an online gaming service 106 maintains a game catalog and a model catalog that may be presented to users in a window of a browser application running on a corresponding user system 108 or a window controlled by the game server engine 104. A user may select a game (created by this or other user) from the game catalog to play. The game catalog includes images of games stored on an online gaming service 106. In addition, a user may select a model (created by this or other user) from the model catalog to modify and/or add to a new game. The model catalog includes images of models stored on an online gaming service 106. In one embodiment, an online gaming service 106 conducts contests for model building, game building, or high scores in individual games. Each online gaming service 106 further hosts a game server engine 104.

In one embodiment, each game server 114 hosts one or more virtual places, and provides those virtual places to user systems 108 via network 102. A virtual place may be, for example, a town, city, state, home, building, park, coffee shop, game site, flat platform, any region on a virtual plane, etc. Each virtual place has a geography and relationships to other virtual places. In one embodiment, the virtual places are connected places (e.g., virtual places are connected with other virtual places) via proximity of places in the virtual world environment, user-defined connection, teleportation connections, etc. Furthermore, users of user systems 108 may gather in, travel through, and interact with other users within the virtual places. In one embodiment, multiple game servers 114 can host different instances of the same place. The virtual places, instances of the virtual places, and connections between places, define the topology of a virtual world.

Figure 6:
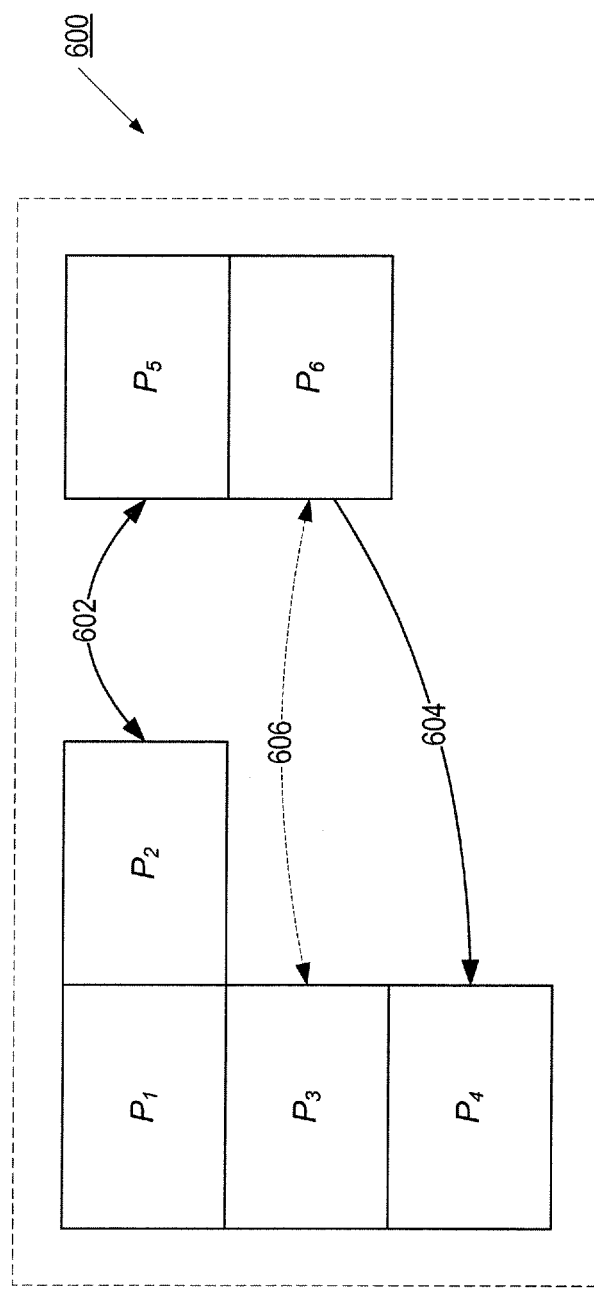
FIG. 6 illustrates an exemplary virtual world topology of connected virtual places.

FIG. 6, for example, illustrates an exemplary virtual world topology 600 of virtual places $P_1$ through $P_6$. A user may move between places within the virtual world 600 as defined by the topology, such as crossing physical boundaries between places $P_1$-$P_4$ or between places $P_5$-$P_6$. Furthermore, a user may "teleport," via a portal, hyperlink, or bounded transport area, between places $P_2$ to $P_5$, $P_6$ to $P_4$, or $P_6$ to $P_3$. In one embodiment, the link between $P_6$ and $P_3$ is a user-created link between places in the virtual world topology 600. Although virtual world topology 600 is illustrated as including six places, virtual world topologies can be created and arranged in any fashion, with varying numbers of virtual places, with varying connections between places, as well connections between virtual worlds, etc. There is no limit to the size or topology of virtual worlds as described herein. Furthermore, as will be discussed in greater detail below, multiple servers can provide one or more virtual places and zero or more instances of each place.

The instance spawning server 110 is responsible for tracking runtime conditions of a virtual world, and dynamically instructing, via network 102, a particular game server 114 to create or destroy instances of places hosted by the online gaming service. In one embodiment, each game server 114 (1 through M) hosts one or more virtual places and a dynamic number of instances of those places. The instances are copies of places that are created and destroyed based on runtime conditions monitored by instance spawning server 110. Various users occupy and move through instances of virtual places while navigating within virtual worlds, and thus runtime conditions, such as place occupancy, fluctuates during runtime. For example, places may be provided with various properties, such as the maximum number of users, the minimum number of users, user ages, clan membership, user rating, groups, user payment level (i.e., paying verses free users), payment of a required amount of virtual currency, etc. Other properties that impact game servers 114, such as server load, user system proximity to game servers 114106, server allocation, user/place allocation, user/place restrictions, etc. are also monitored by instance spawning server 110.

Instance spawning server 110 may then instruct a particular game server 114 to create or destroy place "instances" based on the monitored conditions, such as when the number of users exceeds a maximum number of users or drops below a minimum user threshold. Therefore, the places that make up a virtual world are both dynamic and scalable to more effectively provide a virtual world to user systems 108. Based on runtime conditions, there may be more instances of popular places running, while unpopular places have few or no instance running. Thus, the topology of the virtual environment dynamically scales the number of places based on usage demands placed on the virtual environment by user systems 108.

The game player routing server 112 is responsible, when a user system 108 transfers from one place to another place in a virtual world, for selecting and instructing an online gaming service 106 to direct the user system 108 to the appropriate online gaming service 106 that provides the place and instance of the place selected by game player routing server 112. When a user system 108 initiates a transfer between places (either via a hyperlink, portal, contiguous region, etc.), the game server 114 currently hosting the user requests a target place destination (i.e., a place, instance of the place, and online gaming service that hosts the place) where the current game server 114 can direct the user system 108. In one embodiment, the game player routing server 112 selects the target place destination based on the analysis of one or more routing selection criteria. As will be discussed in more detail below, such routing conditions may include runtime conditions, where "friends" are located, keeping groups of users together, server load distribution, destination online gaming service proximity to requesting user systems, etc. In one embodiment, users routing optimizes user experience by maintaining a continuous user experience, while at the same time maximize the performance of game servers 114.

Figure 2:
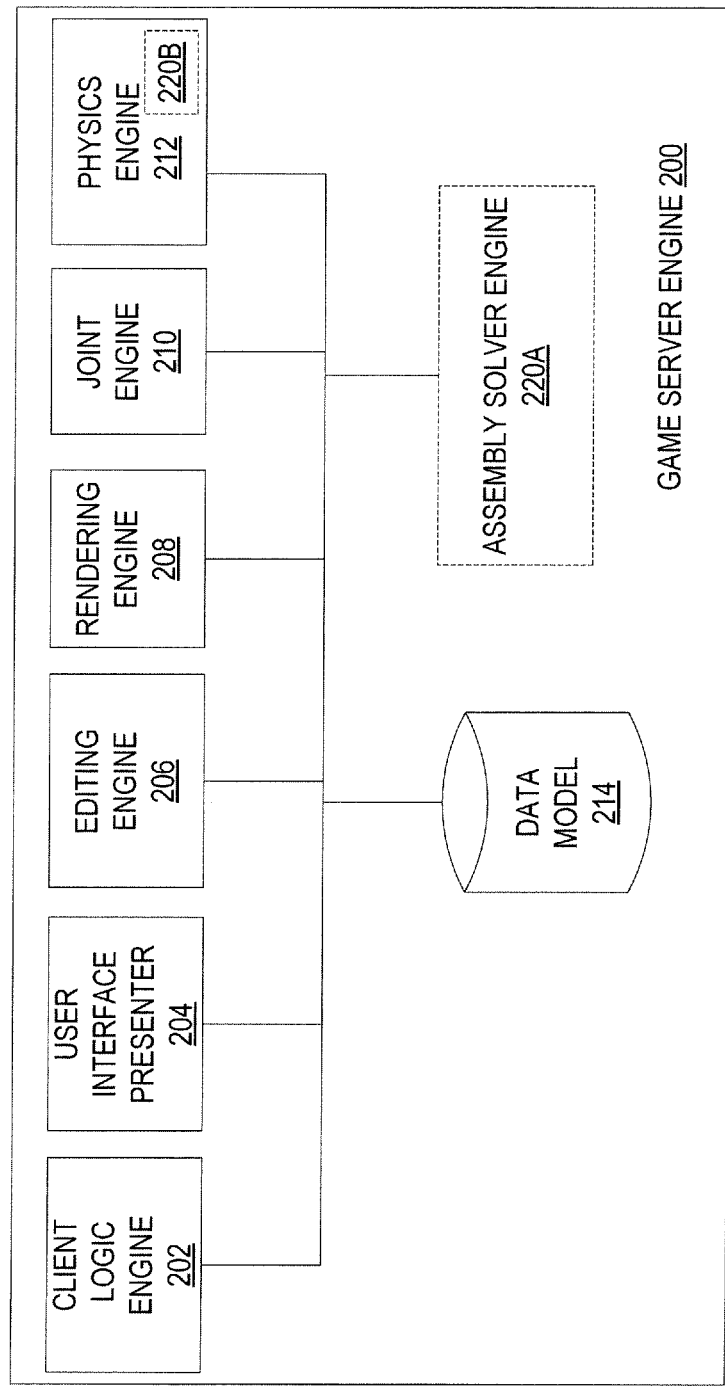
FIG. 2 is a block diagram of one embodiment of a game server engine.

FIG. 2 is a block diagram of one embodiment of a game engine 200 (e.g., game engine 104 of FIG. 1A or game engine 154 of FIG. 1B). The game engine 200 may include a game logic engine 202, a user interface presenter 204, an editing engine 206, a rendering engine 208, a joint engine 210, physics engine 212, a data model 214, and an assembly solver engine 220A. In one embodiment, assembly solver engine 220A may be a standalone engine of game server engine 200, or included in physics simulation engine 212, as illustrated by box 220B.

The game logic engine 202 is responsible for invoking components of the game engine 200 based on user requests, and exchanging data with the online gaming service 106 based on user requests.

The user interface presenter 204 is responsible for generating user interfaces (UIs), presenting UIs to a user and receiving input provided by the user via the UIs. In one embodiment, UIs are presented in a window(s) of a browser application (i.e., a FLASH™, JAVA™ plug-in, SHOCKWAVE™, SILVERLIGHT™, etc. browser application) running on a user system. Alternatively, UIs may be presented in a window(s) controlled by the game engine 200. The UIs provided by the user interface presenter 204 may include, for example, a home page UI, a build UI, a game catalog UI, a model catalog UI, etc. The home page UI may present to a user a list of available options (e.g., to build a new model or game, to access an existing model or game, etc.). The build UI may allow a user to select desired parts and/or models and may display the selected parts and/or models in a 3D virtual world.

The editing engine 206 is responsible for editing new and existing games and models based on user input, defining properties of new and existing models and games, and creating and updating a data model 214 for each new and existing model and game. In one embodiment, the editing engine 206 is further responsible for enabling users to place transportation portals, hyperlinks, contiguous regions, etc. within virtual worlds. A data model 214 is a collection of data describing a game or a model that is structured using a specific format (e.g., XML schema, binary or proprietary format).

The joint engine 210 is responsible for joining parts based on their proximity to each other in the 3D world as will be discussed in more detail below.

The rendering engine 208 is responsible for interpreting and displaying 3D images of models and games within the 3D view.

The physics engine 212 is responsible for simulating the motion of objects (models and/or parts) displayed in the 3D view. In one embodiment, the physics engine 212 simulates the object motion by computing object position and orientation on a frame by frame basis. In one embodiment, physics engine 212 computes object position and orientation periodically (e.g., 30 times per second).

The assembly solver engine 220A or 220B, is responsible for receiving a plurality of 3D objects and determining two or more 3D objects that do not move positions relative to each other during a frame of motion simulation. In one embodiment, the assembly solver engine 220A or 220B creates one or more super bodies that are provided to physics engine 212 on a frame by frame basis, instead of providing individual 3D virtual objects that make up the super bodies and the rigid joints between the 3D virtual objects. However, 3D objects that are not determined to be part of a super body are provided to the physics simulation engine 212 individually, as well as joints between the 3D objects and super bodies.

Figure 3:
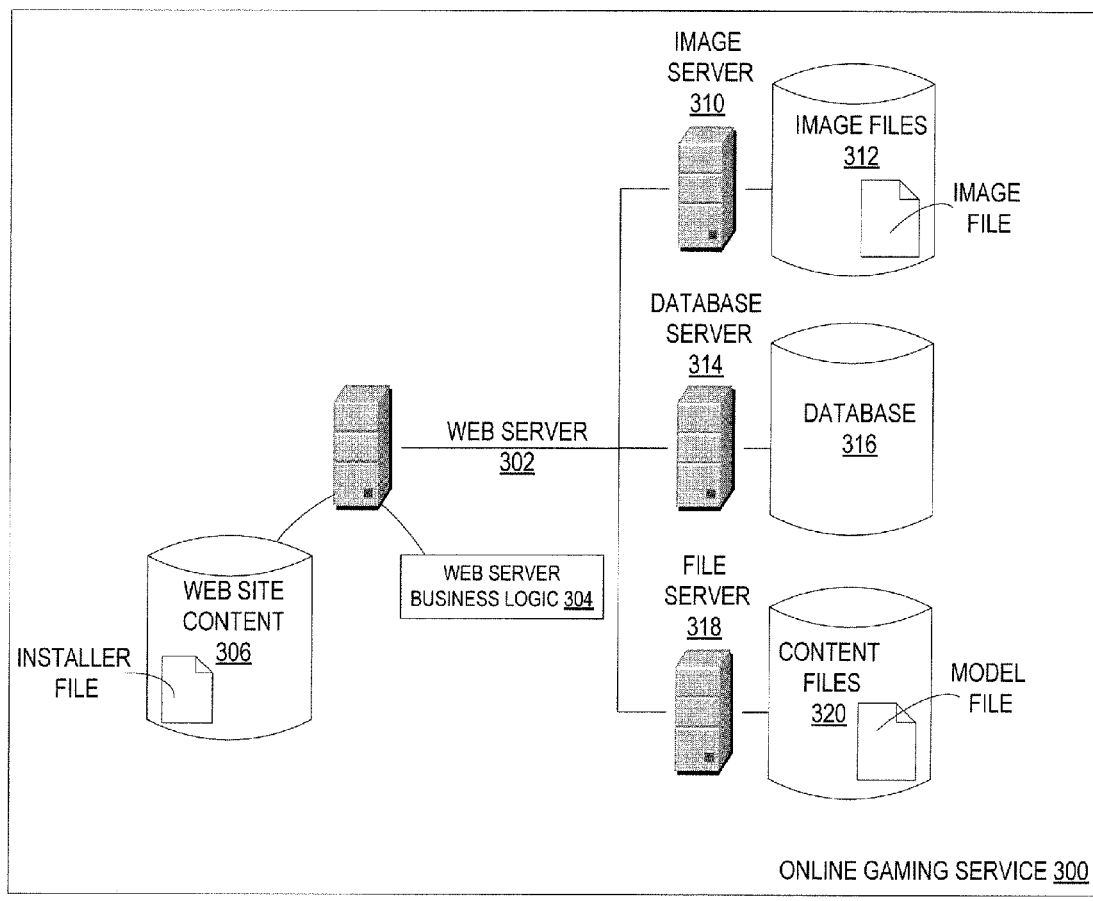
FIG. 3 illustrates one embodiment of the architecture of an online gaming service.

FIG. 3 illustrates one embodiment of the architecture of an online gaming service 300. The online gaming service 300 includes a web server 302, an image server 310, a database server 314 and a file server 318.

The file server 318 stores content files 320 received from user systems 108. The content files 320 include files of models and games created by the users of user systems 108. These files may be, for example, in extensible markup language (XML) format, binary format, etc. The content files 320 may also include various large media files such as textures, skyboxes, sounds, etc.

The image server 310 stores images files 312 that include images of models and games stored on the file server 318.

The database server 314 hosts a database 316 that stores, for example, profile information of each user, account information of each user, game and model information, news information, information pertaining to online forums maintained by the online gaming service 300, etc. The profile information of each user may specify, for example, games created by a user, models created by a user, public information about a user (e.g., "About Me"), recently played games, favorite games, user scores and ratings, etc. The account information may include, for example, user ID and password. The game and model information may include, for example, indexes of game and model files, indexes of corresponding game and model images, game creators, game creation dates, game popularity, user rankings of games, etc. The news information may include, for example, general information about games, information about current contests (e.g., rewards offered for users who achieve high scores for a game, etc.), etc. The forum information may include, for example, discussions about games and models, technical support forum information, etc. In one embodiment, database 316 further stores "friends" of particular user in the profile information, thereby enabling users to specify their social groups (and to enable routing groups of friends along similar paths of places and instances of places in a virtual world).

The web server 302 hosts web site content 306 and web server logic 304. The web server logic 304 receives content requests from clients 106 and/or web browsers 156, and sends pages (e.g., HTML pages) with the requested content to the user systems 108. In one embodiment, the web server logic 304 is responsible for composing model and game catalogs with images of models and games from the image server 310, and sending pages containing these catalogs to the user systems 108. The web site content 306 may include, for example, model and game catalogs, cached model and game files, an installer file for a game server engine 104 or 154 transmitted to a user system 108 or 158, etc.

Figure 4:
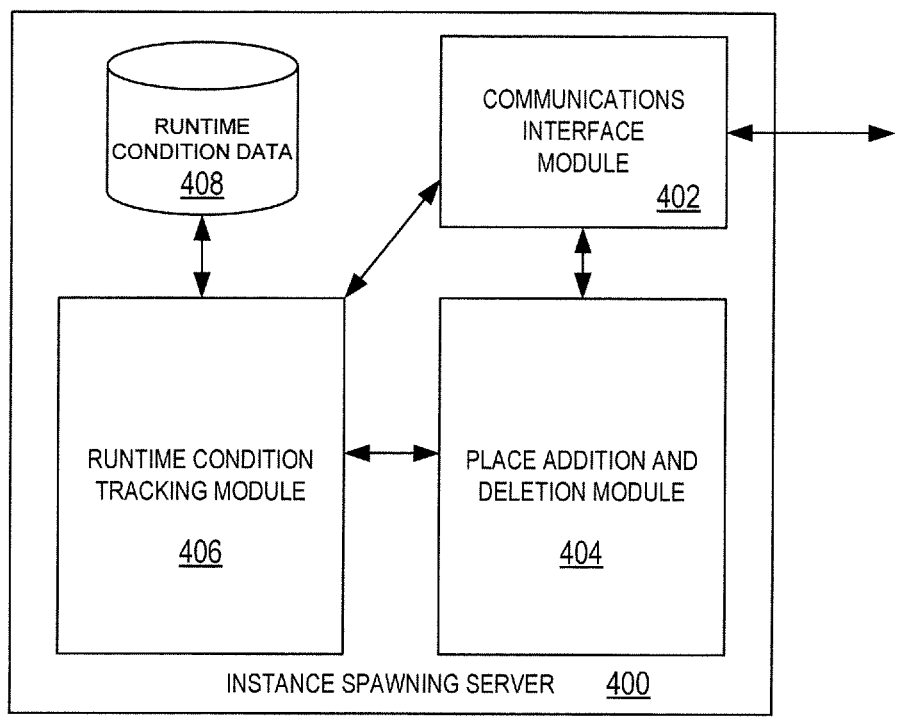
FIG. 4 is a block diagram of one embodiment of an instance spawning server.

FIG. 4 is a block diagram of one embodiment of an instance spawning server 400 (e.g., instance spawning server 110 of FIG. 1). The instance spawning server 400 may include a communications interface module 402, a place addition and deletion module 404, a runtime condition tracking module 406, and runtime condition data 408 storage.

The communications interface module 402 is responsible for exchanging runtime condition data with game player routing server 112, and exchanging runtime condition status requests with game servers 114.

Runtime condition data 408 is responsible for storing runtime conditions tracked by runtime condition tracking module 406.

The runtime condition tracking module 406 is responsible for gathering runtime conditions of a virtual world hosted by a plurality of online game servers 114, as well as runtime conditions of servers of the online gaming service 106. In one embodiment, an exemplary list of conditions tracked by runtime condition tracking module 406 are:

Number of virtual places
User hit rate per virtual place (i.e., place popularity)
Occupancy level for each place
Online gaming service proximity to users
Server allocation for virtual places
Server allocation for user systems
Current user locations
Common place occupants (i.e., what users have occupied the same place(s) for a specific amount of time)
Current server(s) central processing unit loads
Current server incoming and/or outgoing bandwidth usage
Server cost Runtime condition tracking module 406 stores and updates the runtime conditions in runtime condition data 408 storage. In one embodiment, runtime condition tracking module receives requests from a game player routing server (not shown) and responds with runtime data corresponding to the request via communications interface module 402.

The place addition and deletion module 404 is responsible for instructing game servers 114 to create or destroy instances of places based on runtime conditions. In one embodiment, each place has an occupancy limit and an occupancy threshold. Place addition and deletion module 404 queries, for each place in a virtual world, runtime condition tracking module 406 for the current occupancy levels of the instances. When an instance of a place exceeds an occupancy level (i.e., the instance of the place is considered crowded), place addition and deletion module 404 instructs the game server 114 that is currently hosting the place to create a new instance of the place. However, when an instance of the place drops below a threshold (i.e., the instance of the place is considered empty or unoccupied), place addition and deletion module 404 instructs the game server 114 that is currently hosting the instance of the place to destroy the instance.

Figure 5:
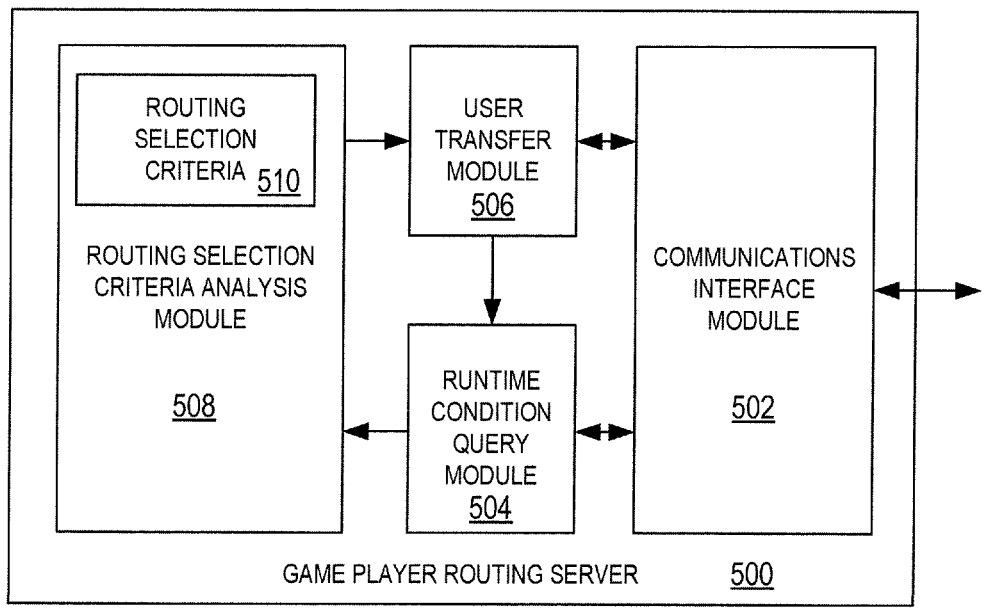
FIG. 5 is a block diagram of one embodiment of a game player routing server.

FIG. 5 is a block diagram of one embodiment of a game player routing server 500 (e.g., game player routing server 112 of FIG. 1). The game player routing server 500 may include a communications interface module 502, user transfer module 506, runtime condition query module 504, routing selection criteria analysis module 508, and routing selection criteria 510.

The communications interface module 502 is responsible for exchanging runtime user routing requests with game servers 114, and exchanging runtime condition status requests with an instance spawning server (i.e., instance spawning server 110 of FIG. 1 or 400 of FIG. 4).

The runtime condition query module 504 is responsible for querying an instance spawning server for current runtimes for a user transfer request. As discussed above, when users transfer between instances of places, the users may also transfer from one game server 114 to another game server 114. The runtime condition query module 504 thus composes a runtime condition query based on the particular user system initiating the place transfer request, instance of the place where the request was issued, and the requested destination place. When runtime condition query module 504 receives a response to the request, the original transfer request and current runtime conditions (i.e., the runtime conditions monitored by runtime condition tracking module 406 of FIG. 4) are forwarded to routing selection criteria analysis module 508.

The routing selection criteria analysis module 508 is responsible for deciding what instance of what place a user system should be routed to, based on a user place transfer request, current runtime conditions associated with the request, and routing selection criteria 510. In one embodiment, a round robin selection scheme is utilized by routing selection criteria analysis module 508, to obtain transfer results that will transfer user systems evenly among instances of a place. However, a predefined order could also be applied, such as directing all transfer requests to a place until the place exceeds its occupancy limit, and then transferring the user system to the next available instance of the place.

In one embodiment, routing selection criteria analysis module 508 utilizes routing selection criteria 510 to adjust a transfer destination result based on the routing selection criteria 510. In addition to current occupancy limits for place, the following may be included as routing selection criteria 510 to impact where a user system is transferred:

Place restrictions (i.e., a place is not suitable for users below a certain age, is not accessible based on a user's subscription level, is not accessible due to current game conditions, etc.)

Server allocation

Server load (i.e., adjust a destination result to distribute the loads among servers of a place)

Server proximity (i.e., adjust result to direct a user system to a server that is physically closer to a user system over a network)

Keep friends together based on user profiles and defined friendship relationships Keep groups together (i.e., when certain groups of people have occupied the same places for a predefined amount of time, the groups are routed together)

Routing selection criteria analysis module 508 analyzes the selection criteria along with the requested transfer, and obtains a transfer result based on the routing selection criteria 510.

The user transfer module 506 is responsible for packaging the analysis results of a transfer request, as generated by routing selection criteria analysis module 508. The results, which will direct a user computer system to a specific instance of a place as well as the online gaming service that hosts the instance of the place, are then communicated by communications interface module 502 to the requesting user system via an online gaming service.

FIG. 6 illustrates an exemplary virtual world topology 600 of connected virtual places. As discussed above, a user may move between places $P_1$ through $P_6$ within the virtual world 600 as defined by the topology, such as crossing physical boundaries between places $P_1$-$P_4$ or between places $P_5$-$P_6$. Furthermore, a user may "teleport," via a hyperlink or bounded transport area, between places $P_2$ to $P_5$, or from $P_6$ to $P_4$. In one embodiment, a virtual world topology may include user defined connections 606 between virtual places, as is illustrated by the dashed line between $P_3$ and $P_6$. Thus, users can create portals or links between place(s), as well as between distinct virtual worlds. Virtual world topology 600 is illustrated as including six places. Virtual world topologies can be created and arranged in any fashion, with varying numbers of virtual places, with varying connections between places, as well as connections between virtual worlds, etc.

Figure 7:
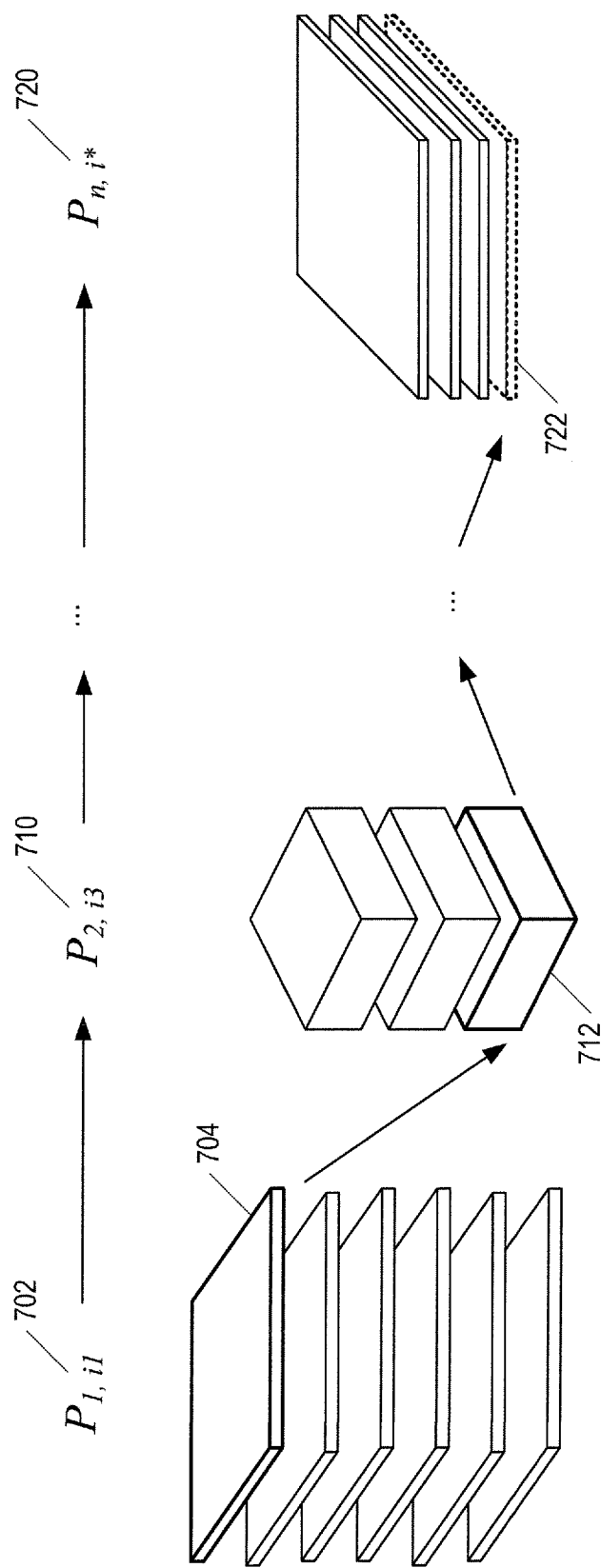
FIG. 7 illustrates an exemplary path between instances of connected virtual places in a virtual world.

FIG. 7 illustrates an exemplary path between instances of connected virtual places in a virtual world. In one embodiment, a user system starts 702 at $P_{1,i1}$ in a virtual world provided by an online gaming service via game servers (not shown), which represents the first instance of the first place 704 provided by a game server. The place provided by the game server enables a user of the user system to navigate within $P_{1,i1}$, interact with other user systems currently occupying $P_{1,i1}$, etc.

A game server may then detect that the user system has entered a portal (i.e., a user system has selected a hyperlink, crossed a physically simulated boundary between places, etc.). In one embodiment, portals are rendered in the simulated virtual world as doors, caves, physical boundaries, transportation systems (i.e., airplanes, busses, subways, etc.), etc. In one embodiment, users are enabled to see adjacent places, such that when they cross a physical boundary to the adjacent place, they are transferred to an instance of the contiguous place. When the portal is entered or boundary crossed, online gaming service requests a place, an instance of a place, and a corresponding game server that hosts the determined place that the user system can be transferred to. As discussed herein, the game server queries a game player routing server, that determines based on runtime conditions, a specific place, instance, and online gaming service where the user system should be routed.

In the illustrated embodiment, a user system is directed to a new place 710, $P_{2,i3}$, that represents the third instance of a second place 712 in the virtual world. The game player routing server's decision is based on an analysis of routing selection criteria and current runtime conditions. Thus, for example, it could have been determined that user system should be directed to $P_{2,i3}$ because the user's friends are currently at $P_{2,i3}$, directing the user system to $P_{2,i3}$ would balance current server loads for online gaming service, game servers hosting instances of $P_2$, recent occupants of $P_{1,i1}$ were directed to $P_{2,i3}$, etc. As discussed herein, many routing selection criteria and runtime conditions are factored into routing decisions.

The user system continues to navigate between connected virtual places in the virtual world and a request is received at a game server to transfer the user system to $P_n$ that represents the $n^{th}$ place in the virtual world. Because the $n^{th}$ place may be crowded, or growing in popularity with virtual occupants, an instance spawning server may determine that a new instance 720 of the $n^{th}$ place should be created (as indicated by the dashed line) resulting in $P_{n,i*}$. The user system could then be directed to $P_{n,i*}$ which represents the newly allocated/created instance of the $n^{th}$ place 722.

As illustrated, the path traversed by a user system in a virtual world is dynamically determined based on runtime conditions of the virtual world, when the user moves between online virtual places. Furthermore, the number of instances of places in the virtual world dynamically scales to the current conditions based on runtime conditions and to preserve user experience continuity. Factors such as server load, server proximity, etc. are utilized when routing users between online gaming services to ensure proper functioning of those systems (i.e., to avoid website slowdowns, network traffic congestions, server balancing, etc.).

Furthermore, user experience continuity is also a factor when making routing decision. As discussed above, and as will be discussed below, routing factors such as user-defined friendship groups and recent common place occupancy, ensure a continuous user experience while navigating within a virtual environment (i.e., user systems are not transferred to unknown places with unknown users). Thus, game player routing balances system runtime conditions with user experience factors to maximize both system resources and user gaming experience.

Figure 8:
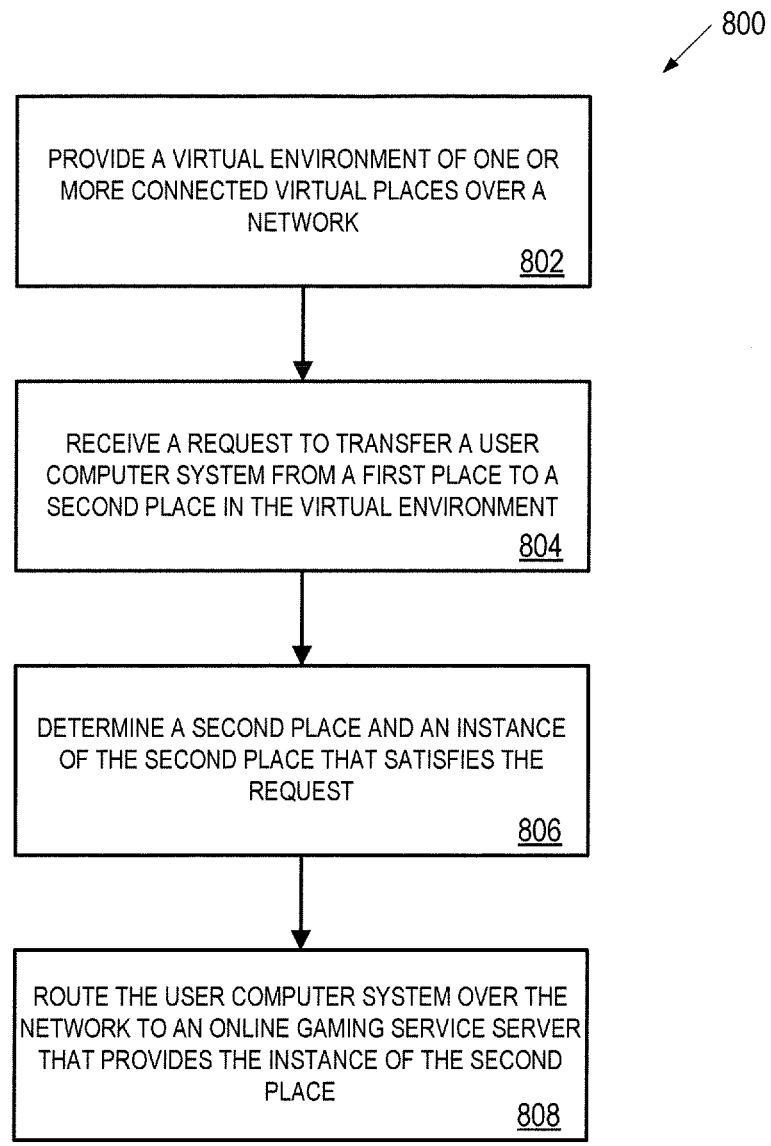
FIG. 8 is a flow diagram of one embodiment of a process for routing a user system between instances of connected places in a simulated virtual environment.

FIG. 8 is a flow diagram of one embodiment of a method 800 for routing a user system between instances of connected places in a simulated virtual environment. The method may be performed by processing logic that may comprise hardware (e.g., dedicated logic, programmable logic, microcode, etc.), software (such as run on a general purpose computer system or a dedicated machine), or a combination of both. In one embodiment, processing logic resides in the system 100 of FIG. 1.

Referring to FIG. 8, method 800 begins with processing logic providing a virtual environment of one or more connected virtual places over a network (processing block 802). A request is received by processing logic to transfer a user computer system from a first place to a second place in the virtual environment (processing block 804). In one embodiment the request is initiated when a user computer system crosses a physically simulated boundary between places, selects a transfer link, enters a new contiguous region simulating a door, cave, hallway, etc. within the simulated virtual world. Furthermore, links or portals between virtual places may also be specified and defined by users.

A second place and an instance of the second place that satisfies the request is determined (processing block 806) and the user computer system is routed over the network to game server that provides the determined instance of the second place (processing block 808). In one embodiment, the determination of the instance of the second place is made by a game player routing server coupled with a game server over a network. Furthermore, the game server, where the user computer system is routed to, may be a different game server or the same game server that received the initial user transfer request.

Figure 9:
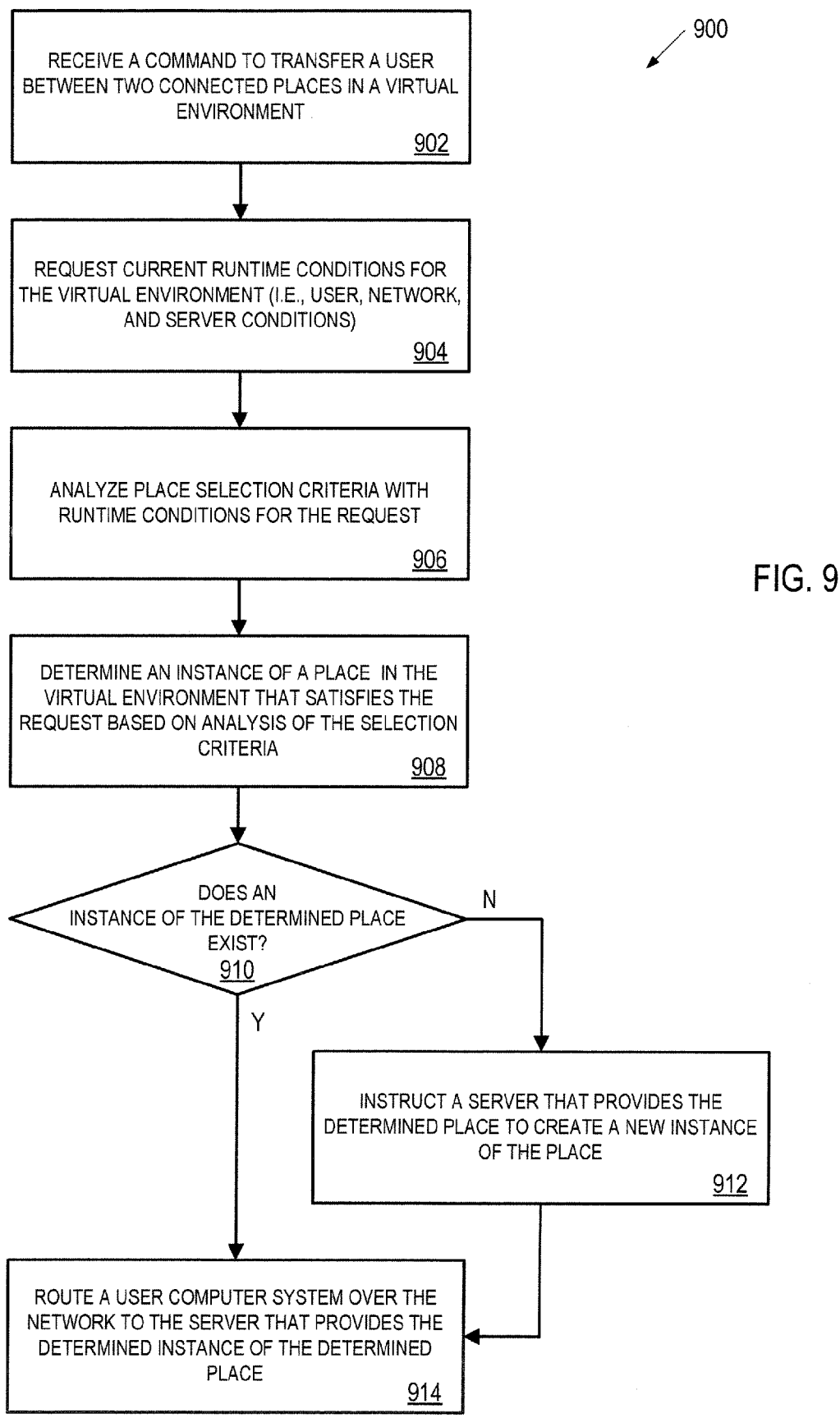
FIG. 9 is a flow diagram of one embodiment of a process for routing a user system between instances of connected places in a simulated virtual environment.

FIG. 9 is a flow diagram of one embodiment of a method 900 for routing a user system between instances of connected places in a simulated virtual environment. The method may be performed by processing logic that may comprise hardware (e.g., dedicated logic, programmable logic, microcode, etc.), software (such as run on a general purpose computer system or a dedicated machine), or a combination of both. In one embodiment, processing logic resides in a game player routing server 500 of FIG. 5.

Referring to FIG. 9, method 900 begins with processing logic receiving a command to transfer a user between two connected places in a virtual environment (processing block 902). In one embodiment, when a user enters a transfer portal (i.e., a door, cave, bus, etc.) in a simulated virtual place, a command to transfer is generated at a game server and transmitted to a game player routing server.

Current runtime conditions are then requested for the virtual environment (processing block 904). In one embodiment, the runtime conditions include user conditions associated with a particular user, such as the user's "friends" defined in a user profile, common occupancy of the user with other users, etc. In one embodiment, a user's recent place occupancy is also utilized as a runtime condition. Thus, when a user goes back and forth across a boundary, the runtime conditions would indicate that the user should shuffle between the same instances of places, rather than being randomly sent to different instances of the places. The runtime conditions may also include network and server conditions, such as network loads, server loads, total occupancy of each instance of each place, hit rates of target places, servers allocated for particular places, servers allocated to particular users, etc.

Place selection criteria and the requested runtime conditions are analyzed (processing block 906). In one embodiment, place selection criteria may includes occupancy minimums and limits associated with certain places, restrictions on entry to certain places, servers allocated to users, servers allocated to places, etc.

An instance of a place in the virtual environment that satisfies the request, based on the analysis of the runtime conditions and selection criteria is determined (processing block 908). The runtime conditions and place selection criteria are analyzed to ensure that a determined destination place and instance satisfies the occupancy conditions for the place, balances server loads for servers providing the place, does not violate user restrictions for entry to the place, ensures user experience continuity, etc. as discussed herein.

A determination is made whether an instance of the determined place exists (processing block 910). As discussed above, because system and game player service resources are allocated based on current user needs, unpopulated places may not have any instances currently allocated. Thus, where a user is directed to a place where instances are not currently allocated, processing logic instructs a game server that will provide the determined place to create a new instance of the place (processing block 912) before routing a user computer system over the network to the game server (processing block 914). However, if the determined instance of the place does exist, the user computer system is routed over the network to the game server that is currently providing the instance of the place (processing block 915).

Figure 10:
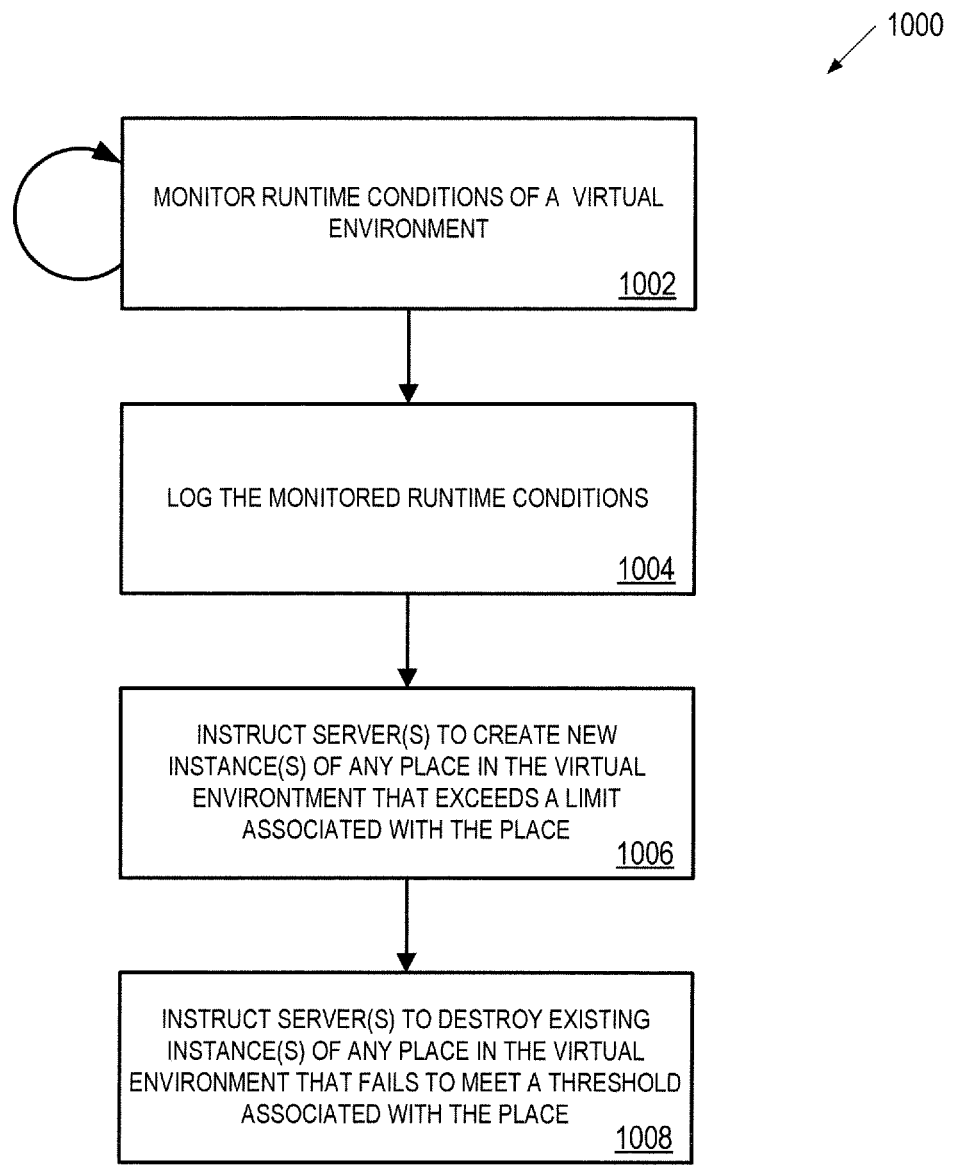
FIG. 10 is a flow diagram of one embodiment of a process for monitoring runtime conditions and dynamically scaling a virtual environment based on the monitored conditions.

FIG. 10 is a flow diagram of one embodiment of a method 1000 for monitoring runtime conditions and dynamically scaling a virtual environment based on the monitored conditions. The method may be performed by processing logic that may comprise hardware (e.g., dedicated logic, programmable logic, microcode, etc.), software (such as run on a general purpose computer system or a dedicated machine), or a combination of both. In one embodiment, processing logic resides in an instance spawning server 400 of FIG. 4.

Referring to FIG. 10, method 1000 begins with processing logic monitoring runtime conditions of an online virtual environment (processing block 1002). As discussed above, the runtime conditions for the virtual environment include user conditions, network conditions, and server conditions. In one embodiment, processing logic monitors the conditions on a periodic basis such as once a second, once every ½ second, etc. In another embodiment, processing logic monitors the conditions whenever an action, such as user transfers, place creation, place destruction, user link creation, etc. occur. The monitored runtime conditions are logged (processing block 1004) and stored in a memory. In one embodiment, logged runtime conditions are electronically time stamped to provide reference data about when a condition was monitored.

Based on the monitored runtime conditions, processing logic may instruct game server(s) to create new instance(s) of any place in the virtual environment that exceeds a limit associated with the place (processing block 1006). In one embodiment, places are provided with attributes, such as the maximum occupancy of the place. Thus, new instance of places can be created based on the current runtime conditions, a place that exceeds, or is about to exceed, a current maximum occupancy limit for the place.

Processing logic further instructs game server(s) to destroy existing instance(s) of any place in the virtual environment that fails to meet a threshold associated with the place (processing block 1008). Similar to a maximum occupancy limit associated with places, places also may include an occupancy threshold. Thus, when the monitored occupancy at an instance of a virtual place drops below the threshold, the instance can be destroyed, and any users currently at the place, if any, can be routed to a different instance of the place.

Therefore, popular places in a virtual environment are not allowed to persist in an overly crowded state. Conversely, empty places do not remain allocated when the resources dedicated to those places are not being utilized. As a result, the virtual environment, and the number of places in the virtual environment, are dynamically created and destroyed based on current runtime conditions of the virtual environment. Furthermore, the dynamic creation and allocation enables a virtual environment topology that scales to current, and fluctuating, user needs exerted upon places in the virtual environment.

Figure 11:
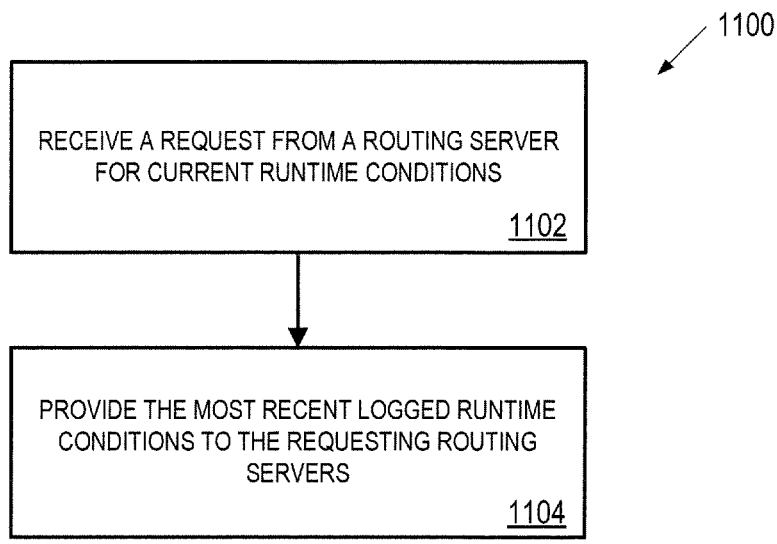
FIG. 11 is a flow diagram of one embodiment of a process for supplying a routing server with current runtime conditions for a virtual environment.

FIG. 11 is a flow diagram of one embodiment of a method 1100 for supplying a routing server with current runtime conditions for a virtual environment. The method may be performed by processing logic that may comprise hardware (e.g., dedicated logic, programmable logic, microcode, etc.), software (such as run on a general purpose computer system or a dedicated machine), or a combination of both. In one embodiment, processing logic resides in an instance spawning server 400 of FIG. 4.

Referring to FIG. 11, method 1100 begins with processing logic receiving a request from a routing server for current runtime conditions (processing block 1102). As discussed above, processing logic of an instance spawning server monitors and logs/stores runtime conditions on a periodic or event driven basis. In response to the request, processing logic provides the most recent logged runtime conditions to the requesting routing server (processing block 1104).

Figure 12:
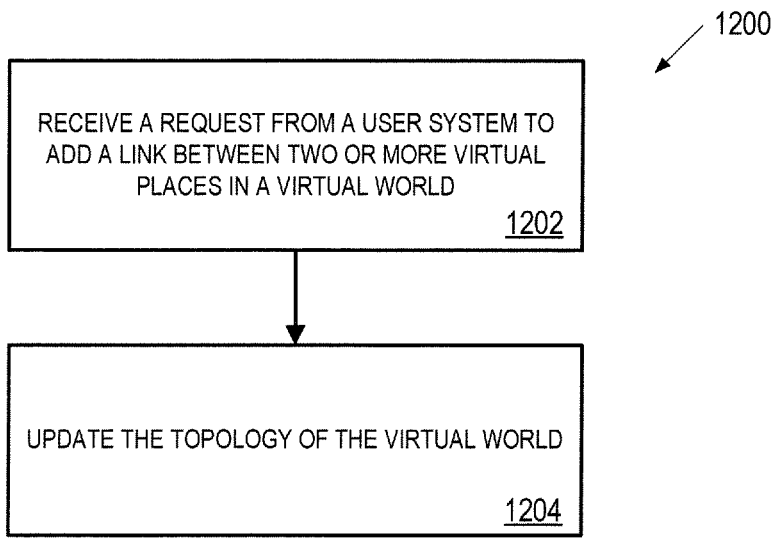
FIG. 12 is a flow diagram of one embodiment of a process for updating a virtual world topology based on user requests.

FIG. 12 is a flow diagram of one embodiment of a method 1200 for updating a virtual world topology based on user requests. The method may be performed by processing logic that may comprise hardware (e.g., dedicated logic, programmable logic, microcode, etc.), software (such as run on a general purpose computer system or a dedicated machine), or a combination of both. In one embodiment, processing logic resides in game engine 200 of FIG. 2.

Referring to FIG. 12, method 1200 begins with processing logic receiving a request from a user system to add a link between two or more virtual places in a virtual world (processing block 1202). Processing logic then updates the topology of the virtual world (processing block 1204). As discussed above, links between places define the topological connection between different places in a virtual world. In one embodiment, links such as doors, teleport areas, predefined areas, physically simulated boundaries, etc., may be defined by users, in order to modify the existing topology of a virtual environment.

Figure 13:
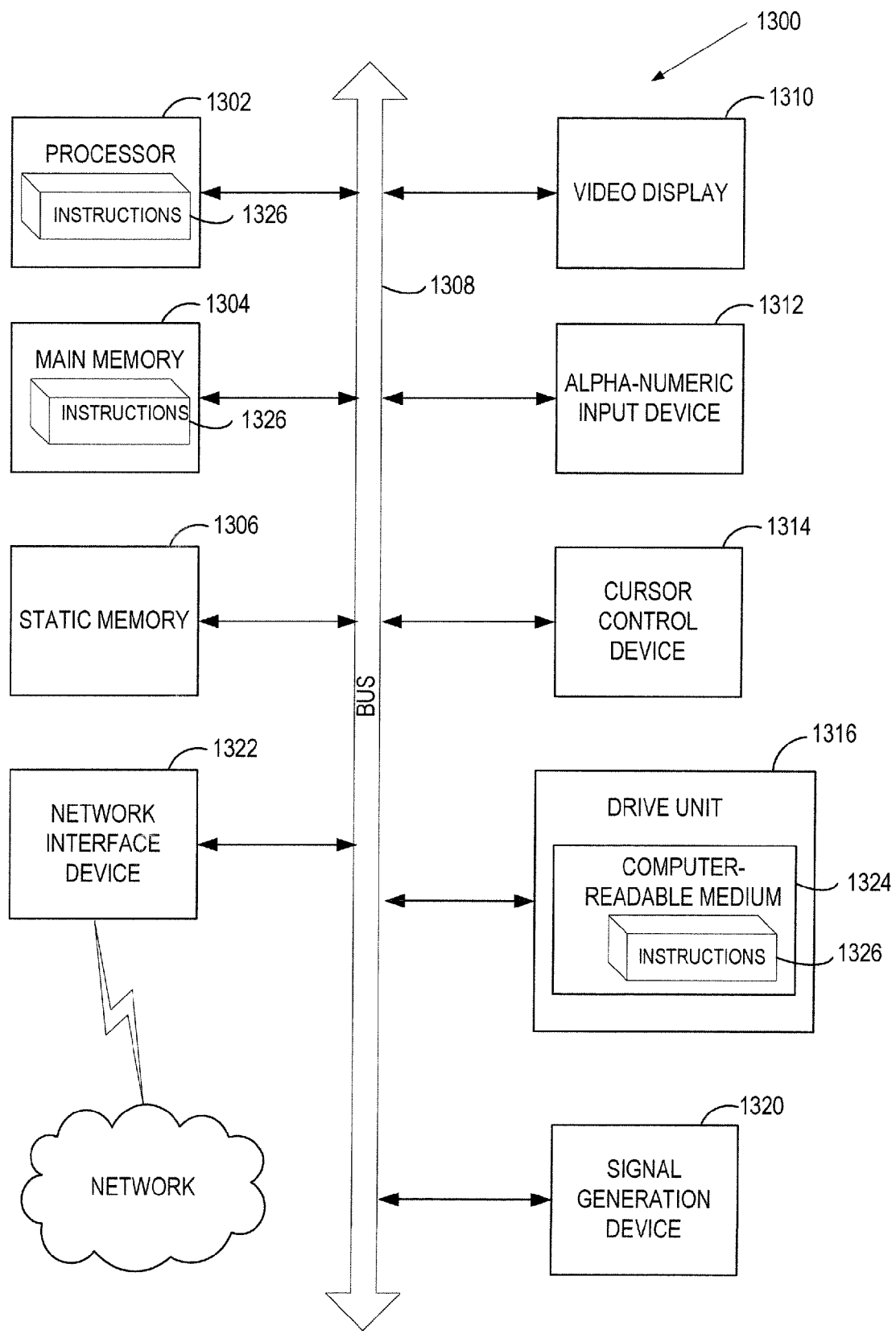
FIG. 13 is a block diagram of one embodiment of a computer system.

FIG. 13 shows a diagrammatic representation of machine in the exemplary form of a computer system 1300 within which a set of instructions, for causing the machine to perform any one of the methodologies discussed above, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 1300 includes a processor 1302, a main memory 1304 and a static memory 1306, which communicate with each other via a bus 1308. The computer system 1300 may further include a video display unit 1310 (e.g., a liquid crystal display (LCD) or a cathode ray tube (CRT)). The computer system 1300 also includes an alphanumeric input device 1312 (e.g. a keyboard), a cursor control device 1314 (e.g. a mouse), a disk drive unit 1316, a signal generation device 1320 (e.g., a speaker) and a network interface device 1322.

The disk drive unit 1316 includes a computer-readable medium 1324 on which is stored a set of instructions (i.e., software) 1326 embodying any one, or all, of the methodologies described above. The software 1326 is also shown to reside, completely or at least partially, within the main memory 1304 and/or within the processor 1302. The software 1326 may further be transmitted or received via the network interface device 1322. For the purposes of this specification, the term "computer-readable medium" shall be taken to include any medium that is capable of storing or encoding a sequence of instructions for execution by the machine and that cause the machine to perform any one of the methodologies of the present invention. The term "computer-readable medium" shall accordingly be taken to include, but not be limited to, solid-state memories, and optical and magnetic disks.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method, comprising:
in response to a request of a user computer system to transfer from a first place to a second place in a virtual world environment, identifying, by a processor, a plurality of instances of the second place, wherein the virtual world environment comprises a plurality of connected places, and wherein the virtual world environment further comprises the plurality of instances of the second place and zero or more instances of each connected place from the plurality of connected places;
determining, by the processor, one or more other users associated with a user of the user computer system, wherein the one or more other users are associated with the user of the user computer system by at least a common place occupancy association with the user, wherein the common place occupancy association indicates that the one or more other users have occupied the first place in the virtual world environment at a same time as the user;
determining, by the processor, one of the plurality of instances of the second place in the virtual world environment that satisfies the request of the user computer system based at least in part on an association with one of the one or more other users, wherein the one of the one or more other users has been routed to the determined instance, and wherein the one of the one or more other users is associated with the user of the user computer system by at least the common place occupancy association;
routing, by the processor, the user computer system to a game server that provides the determined instance of the second place in the virtual world environment; and
updating, by the processor, runtime conditions of the virtual world environment associated with the user to indicate that the user computer system has been routed to the game server that provides the determined instance of the second place in the virtual world environment.

2. The method of claim 1 further comprising:
analyzing one or more selection criteria associated with the request;
determining a specific instance of the second place where the user computer system will be directed to based on analysis results of the selection criteria; and
directing the user computer system to a particular server game server that provides the specific instance of the second place.

3. The method of claim 2, further comprising:
monitoring runtime conditions associated with each instance of each place in the virtual world environment; and
analyzing the monitored runtime conditions as a selection criteria along with the one or more selection criteria.

4. The method of claim 3, wherein monitoring runtime conditions further comprises:
  directing a game server to create a new instance of a place from the plurality of connected places when the monitored runtime conditions indicate that a number of user computer systems at an instance of the place exceeds a limit; and
  directing the game server to destroy an existing instance of the place when the monitored runtime conditions indicate that a number of user computer systems at the existing instance of the place is below a threshold, wherein user computer systems at the existing instance of the place to be destroyed are directed to a different instance of the place.

5. The method of claim 2, wherein the selection criteria includes one or more selection criteria selected from the group consisting of destination place occupancy, destination place restrictions, server allocation, and server load for one or more servers that provide the destination place, and common place occupants.

6. The method of claim 2, further comprising:
  receiving data from a user computer system that specifies friends of a user of the user computer system;
  storing friendship data in a user profile associated with the user computer system; and
  analyzing the friendship data as a selection criteria along with the one or more selection criteria.

7. The method of claim 1, wherein the request to transfer is received in response to the user computer system accessing a transfer portal.

8. The method of claim 7, wherein the transfer portal is visually simulated in the virtual environment as a physically simulated boundary in the first place, a door, a cave, a transportation mechanism, or a teleporter.

9. The method of claim 7, wherein the transfer portal is a user-created transfer portal in the virtual environment.

10. The method of claim 1, wherein the virtual environment is an online multiplayer gaming environment.

11. A non-transitory computer readable storage medium that provides instructions, which when executed by a processor, cause the processor to perform operations comprising:
  in response to a request of a user computer system to transfer from a first place to a second place in a virtual world environment, identifying, by the processor, a plurality of instances of the second place, wherein the virtual world environment comprises a plurality of connected places, and wherein the virtual world environment further comprises the plurality of instances of the second place and zero or more instances of each connected place from the plurality of connected places;
  determining, by the processor, one or more other users associated with a user of the user computer system, wherein the one or more other users are associated with the user of the user computer system by at least a common place occupancy association with the user, wherein the common place occupancy association indicates that the one or more other users have occupied the first place in the virtual world environment at a same time as the user;
  determining, by the processor, one of the plurality of instances of the second place in the virtual world environment that satisfies the request of the user computer system based at least in part on an association with one of the one or more other users, wherein the one of the one or more other users has been routed to the determined instance, and wherein the one of the one or more other users is associated with the user of the user computer system by at least the common place occupancy association;
  routing, by the processor, the user computer system to a game server that provides the determined instance of the second place in the virtual world environment; and
  updating, by the processor, runtime conditions of the virtual world environment associated with the user to indicate that the user computer system has been routed to the game server that provides the determined instance of the second place in the virtual world environment.

12. The non-transitory computer readable storage medium of claim 11, the operations further comprising:
  analyzing one or more selection criteria associated with the request;
  determining a specific instance of the second place where the user computer system will be directed to based on analysis results of the selection criteria; and
  directing the user computer system to a particular game server that provides the specific instance of the second place.

13. The non-transitory computer readable storage medium of claim 12, the operations further comprising:
  monitoring runtime conditions associated with each instance of each place in the virtual world environment; and
  analyzing the monitored runtime conditions as a selection criteria along with the one or more selection criteria.

14. The non-transitory computer readable storage medium of claim 13, wherein monitoring runtime conditions further comprises:
  directing a game server to create a new instance of a place from the plurality of connected places when the monitored runtime conditions indicate that a number of user computer systems at an instance of the place exceeds a limit; and
  directing the game server to destroy an existing instance of the place when the monitored runtime conditions indicate that a number of user computer systems at the existing instance of the place is below a threshold, wherein user computer systems at the existing instance of the place to be destroyed are directed to a different instance of the place.

15. The non-transitory computer readable storage medium of claim 12, wherein the selection criteria includes one or more selection criteria selected from the group consisting of destination place occupancy, destination place restrictions, server allocation, server load for one or more servers that provide the destination place, and common place occupants.

16. The non-transitory computer readable medium of claim 12, the operations further comprising:
  receiving data from a user computer system that specifies friends of a user of the user computer system;
  storing friendship data in a user profile associated with the user computer system; and
  analyzing the friendship data as a selection criteria along with the one or more selection criteria.

17. The non-transitory computer readable storage medium of claim 11, wherein the request to transfer is received in response to the user computer system accessing a transfer portal.

18. The non-transitory computer readable storage medium of claim 17, wherein the transfer portal is visually simulated in the virtual environment as a physically simulated boundary in the first place, a door, a cave, a transportation mechanism, or a teleporter.

19. The non-transitory computer readable storage medium of claim 17, wherein the transfer portal is a user-created transfer portal in the virtual environment.

20. The non-transitory computer readable storage medium of claim 11, wherein the virtual environment is an online multiplayer gaming environment.

21. A system, comprising:
a routing server comprising a memory and a processor operatively coupled to the memory, wherein the processor is to:
in response to a request of a user computer system to transfer from a first place to a second place in a virtual world environment, identify a plurality of instances of the second place, wherein the virtual world environment comprises a plurality of connected places, and wherein the virtual world environment further comprises the plurality of instances of the second place and zero or more instances of each connected place from the plurality of connected places;
determine one or more other users associated with a user of the user computer system, wherein the one or more other users are associated with the user of the user computer system by at least a common place occupancy association with the user, wherein the common place occupancy association indicates that the one or more other users have occupied the first place in the virtual world environment at a same time as the user;
determine one of the plurality of instances of the second place in the virtual world environment that satisfies the request of the user computer system based at least in part on an association with one of the one or more other users, wherein the one of the one or more other users has been routed to the determined instance, and wherein the one of the one or more other users is associated with the user of the user computer system by at least the common place occupancy association;
route the user computer system over a network to a game server that provides the determined instance of the second place in the virtual world environment; and
update runtime conditions of the virtual world environment associated with the user to indicate that the user computer system has been routed to the game server that provides the determined instance of the second place in the virtual world environment.

22. The system of claim 21, wherein the virtual environment is an online multiplayer gaming environment and wherein the virtual environment is provided by one or more game servers coupled with the routing server over the network.

23. The system of claim 22, wherein the routing server is further to:
analyze one or more selection criteria associated with the request,
determine a specific instance of the second place where the user computer system will be directed to based on analysis results of the selection criteria, and
direct the user computer system to a particular game server that provides the specific instance of the second place.

24. The system of claim 23, further comprising:
an instance spawning server coupled with the game server over the network to
monitor runtime conditions associated with each instance of each place in the virtual world environment and supply, in response to a request of the routing server, the monitored runtime conditions as one of the one or more selection criteria,
direct a game server to create a new instance of a place from the plurality of connected places when the monitored runtime conditions indicate that a number of user computer systems at an instance of the place exceeds a limit; and
direct the game server to destroy an existing instance of the place when the monitored runtime conditions indicate that a number of user computer systems at the instance of the place is below a threshold, wherein user computer systems at the place to be destroyed are directed to a different instance of the place.

25. The system of claim 23, wherein the system further comprises a plurality of game servers distributed over a network, wherein each of the plurality of game servers is coupled to the routing server and the instance spawning server over the network.

26. The system of claim 25, wherein the instance spawning server to ensure that no instances of a place are allocated by the plurality of game servers when runtime conditions indicate that no user computer systems are currently at the place.

* * * * *